(12) United States Patent
Klett et al.

(10) Patent No.: US 11,090,726 B2
(45) Date of Patent: Aug. 17, 2021

(54) APPARATUS AND METHOD FOR THREE-DIMENSIONAL METAL PRINTING

(71) Applicant: UT-BATTELLE, LLC, Oak Ridge, TN (US)

(72) Inventors: James W. Klett, Knoxville, TN (US); Amelia M. Elliott, Cleveland, TN (US); Makayla S. Edwards, Knoxville, TN (US); Kelsey L. Hedrick, Vonore, TN (US); Ryan K. Duncan, Knoxville, TN (US); Alex G. Hessler, Saint Petersburg, FL (US); Corson L. Cramer, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 83 days.

(21) Appl. No.: 16/152,612

(22) Filed: Oct. 5, 2018

(65) Prior Publication Data
US 2019/0105710 A1  Apr. 11, 2019

Related U.S. Application Data

(60) Provisional application No. 62/569,764, filed on Oct. 9, 2017.

(51) Int. Cl.
| B22F 10/10 | (2021.01) |
| B22F 3/20 | (2006.01) |
| B22F 1/00 | (2006.01) |
| B33Y 10/00 | (2015.01) |
| B33Y 70/00 | (2020.01) |
| B33Y 30/00 | (2015.01) |

(52) U.S. Cl.
CPC ............ *B22F 10/10* (2021.01); *B22F 1/0011* (2013.01); *B22F 1/0062* (2013.01); *B22F 3/20* (2013.01); *B33Y 10/00* (2014.12); *B33Y 30/00* (2014.12); *B33Y 70/00* (2014.12); *B22F 2998/10* (2013.01); *B22F 2999/00* (2013.01)

(58) Field of Classification Search
CPC .......... B22F 3/008; B22F 3/20; B22F 1/0062; B22F 1/0011; B22F 2998/10; B22F 2999/00; B33Y 30/00; B33Y 10/00; B33Y 70/00
See application file for complete search history.

(56) References Cited

U.S. PATENT DOCUMENTS

| 6,027,326 | A | * | 2/2000 | Cesarano, III | .......... B28B 1/001 425/375 |
| 2012/0177811 | A1 | * | 7/2012 | Hefner | .................. G01N 17/04 427/9 |
| 2015/0183164 | A1 | | 7/2015 | Duty et al. | |
| 2016/0168453 | A1 | * | 6/2016 | Florio | ...................... C09K 8/80 507/203 |

(Continued)

*Primary Examiner* — Rebecca Janssen
(74) *Attorney, Agent, or Firm* — Pauley Erickson & Swanson

(57) ABSTRACT

An apparatus and device for building an article by additive manufacturing or 3-D printing. The method includes feeding a supply of particulate slurry to and through a nozzle, such as including an integrated pump, to form a plurality of beads and layers of the slurry on a deposition surface, and ultimately forming a desirable article from the layers of deposited material. The liquid phase of the slurry is desirably removed by heat, and the deposited layers can be sintered or otherwise fused as needed.

19 Claims, 3 Drawing Sheets

(56) References Cited

U.S. PATENT DOCUMENTS

2018/0027615 A1    1/2018  Rios et al.
2018/0027616 A1    1/2018  Rios et al.
2020/0308062 A1*  10/2020  Klett ...................... B33Y 40/20

* cited by examiner

APPARATUS AND METHOD FOR THREE-DIMENSIONAL METAL PRINTING

CROSS REFERENCE TO RELATED APPLICATION

This application claims the benefit of U.S. Provisional Application, Ser. No. 62/569,764, filed 9 Oct. 2017. The provisional application is hereby incorporated by reference herein in their entirety and are made a part hereof, including but not limited to those portions which specifically appear hereinafter.

GOVERNMENT SUPPORT CLAUSE

This invention was made with government support under Contract No. DE-AC05-00OR22725 awarded by the U.S. Department of Energy. The government has certain rights in the invention.

FIELD OF THE INVENTION

This invention relates to 3-D printing or additive manufacturing, and more particularly to printing with metal, ceramic, or other particulate slurry materials.

BACKGROUND OF THE INVENTION

The popularity of 3-D printing has grown sharply in the last several years due primarily to the emergence of the desktop 3-D printer, generically known as fused filament fabrication (FFF) or additive manufacturing. Extrusion-based 3-D printing systems generally build up three-dimensional parts by depositing two-dimensional layers in a successive fashion. This typically involves directing a nozzle along a specific pattern in the horizontal (X-Y) plane and incrementing along the Z-axis.

Metal printing primarily involves a powder bed of the metal, in which one of several methods solidifies the metal in each layer. First a roller spreads the metal in a thin layer on an indexable bed (can move up and down). After each layer is spread, either a laser or e-beam is used to melt the metal in only the desired locations (i.e., the slice of the 3-D part), and the process repeats for what can be thousands of layers. Thus a 3-D part is produced. Another methods uses an injet with a binder to print the 'slice' onto each layer. This is called direct jet printing. After the injet builds the part, a method not unlike archeology is used to unearth the part from the bed of powder. At this stage, it is just a simple part with a binder holding everything together. The part is then sintered in a furnace under a variety of conditions, and then can be backfilled with another metal that sucks into the porosity left during the sintering process.

Another method that is becoming popular is that of a wire melting process. This is basically a wire fed welder that is indexed on a robotic arm. Thus, wherever the robotic arm places the head of the welder, metal is deposited and a 3-D part can be made (i.e., like a hot glue gun with a metal feed).

Another method that has developed recently is that of embedding metal powder in a polymer filament that is used with the fused deposition method (i.e., melting a polymer filament at the tip of a nozzle and making the part in that manner). The issue with this is the volume of powder that can be attained in the polymer and still be viable as a filament for the process.

Thus there is a continuing desire and/or need for improved metal printing.

SUMMARY OF THE INVENTION

The invention generally relates to using metal print material for 3-D printed articles, and more particularly to an apparatus and methods of printing metal articles.

The invention provides for the printing of metal objects using an inexpensive printer. By using a novel slurry printing material, the invention provides high metal concentrations in printed objects, which in turn results in minor shrinkage after printing and sintering. Further advantages of this invention include, for example, allowing 3-D metal printing in zero gravity, as it uses a slurry and not a powder bed, and using an aqueous slurry means the printing material can be non-flammable.

Embodiments of the invention include a method for building an article by additive manufacturing via the steps of: providing a supply of particulate slurry; feeding the particulate slurry to a nozzle; depositing from the nozzle an initial layer of the particulate slurry in a 2-D plane; and depositing from the nozzle a second layer of a material adjacent the initial layer. The method desirably includes heating the article to remove the binder material and sinter the powder. In embodiments of this invention, any porosity in the article can be filled with an additional material after sintering.

The invention further includes a method for building an article by additive manufacturing comprising the steps of: a) mixing a volume of a powdered material with a volume of a liquid binder to form a slurry; b) pumping the slurry from a reservoir to a nozzle with a pump; c) extruding the slurry with the nozzle in a X-Y plane at a constant Z-coordinate distance to form a layer of the article; and d) repeating steps b) and/or c) at each consecutive Z-coordinate distance until the article is built. The method further includes heating or pyrolyzing the binder material away during sintering of deposited slurry layers.

The invention further provides or includes a particulate slurry printing material for three-dimensional printing, formed of a powder and a binder material. Any powder that can be sintered together under heat, or otherwise fused together, can be used in this invention. In embodiments of this invention, the particulate slurry comprises a binder material mixed with a powder selected from a metal powder, a ceramic powder, a carbon powder, an explosive material, or combinations thereof. The binder material can be a polymer in a solvent, such as a phenolic or novolac binder, or a polymer gel.

The invention further includes a three-dimensional printing apparatus. The apparatus includes a moveable arm system and a deposition surface in combination with the arm system. A nozzle is moveable by the arm system, and includes a nozzle outlet configured to deposit the particulate slurry material in material beads to form layers on the deposition surface. A slurry reservoir is configured to contain a supply of the particulate slurry for printing, and a tubing connecting the slurry reservoir to the nozzle. A pump is connected to the arm system and between the slurry reservoir and the nozzle. Preferably the nozzle includes the pump at (e.g., just upstream) of the nozzle outlet. An evaporation device can be used in combination with the deposition surface to evaporate the solvent during or after the build. A sinter machine can be included or used to heat the article to remove the binder material and sinter the powder.

Other objects and advantages will be apparent to those skilled in the art from the following detailed description taken in conjunction with the appended claims and drawings.

DETAILED DESCRIPTION OF THE INVENTION

The present invention provides a device and method for building an article by additive manufacturing or 3-D printing. The method includes feeding a supply of particulate slurry to and through a nozzle to form a plurality of beads, and then layers, of the slurry on a deposition surface, and ultimately forming a desirable article from the layers of deposited material. The liquid phase of the slurry is desirably removed by heat, and the deposited layers can be sintered or otherwise fused as needed.

Figure 1:
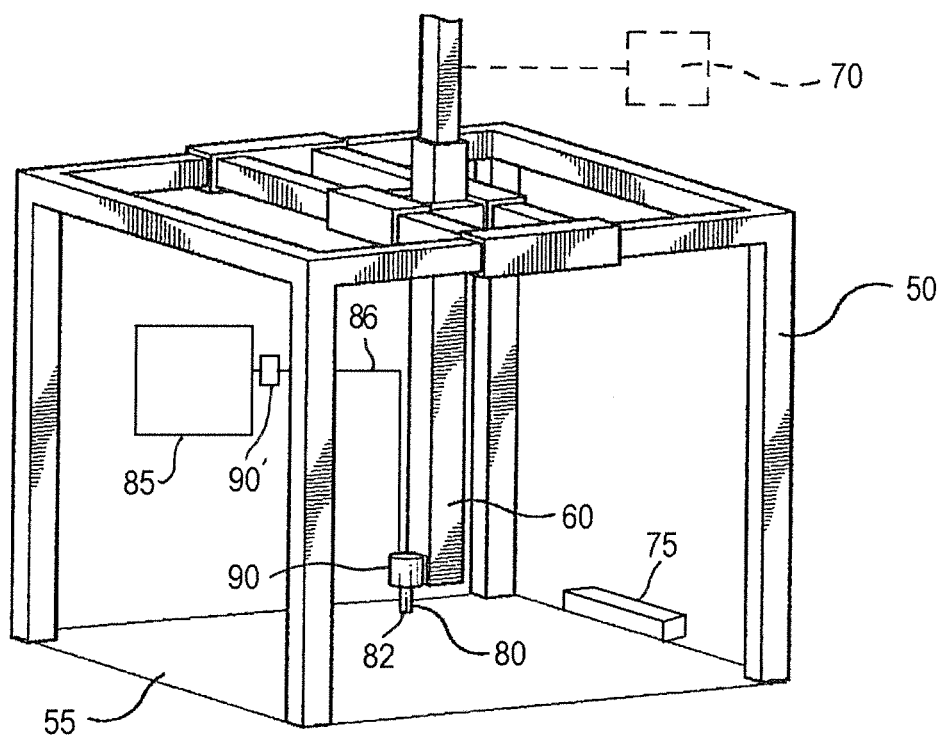
FIG. 1 generally illustrates an apparatus according to one embodiment of this invention.

FIG. 1 illustrates an exemplary three-dimensional printing apparatus 20, according to one embodiment of this invention. The apparatus 20 includes an arm 60 that is moveable above a deposition surface 55, and controlled by controller 70. In FIG. 1, the arm is part of a gantry system 50 over the deposition surface 55, such as for large scale builds, but any suitable robotic or printing arm system can be used and/or modified according to this invention.

The apparatus 20 includes a nozzle 80 in combination with the arm 60 to move the nozzle over the deposition surface 55. The nozzle 80 includes a nozzle outlet 82 configured to deposit a particulate slurry material in material beads to form layers on the deposition surface 55. The nozzle 80 is connected to a slurry reservoir 85 configured to contain a supply of the particulate slurry for printing. Any suitable tubing 86 can be used to connect the reservoir 85 and the nozzle 80, and preferably nonstick (e.g., PTFE) coated tubing is used to reduce friction.

Embodiments of this invention incorporate a pump to move the slurry material to and/or through the nozzle for deposition. The pump is preferably disposed between the reservoir 85 and the nozzle 80, in combination with the tubing 86. The pump can be connected to the reservoir 85, the gantry system 50, the arm 60, and/or the nozzle 80. As shown in FIG. 1, some embodiments of this invention have a nozzle 80 that includes a slurry pump 90 integrated therein, such as a screw pump, a peristaltic pump, or a progressive cavity pump. The printing device and/or nozzle can have various sizes, shapes, and configurations, depending on need. For example, in some embodiments the device can have multiple nozzles to print multiple materials. In other embodiments the reservoir can be off the device printer, can be a syringe/injector structure (e.g., a paste extruder), and/or have a second, upstream pump 90' to pump the slurry to the nozzle pump inlet, such as to allow for very large prints.

Figure 2:
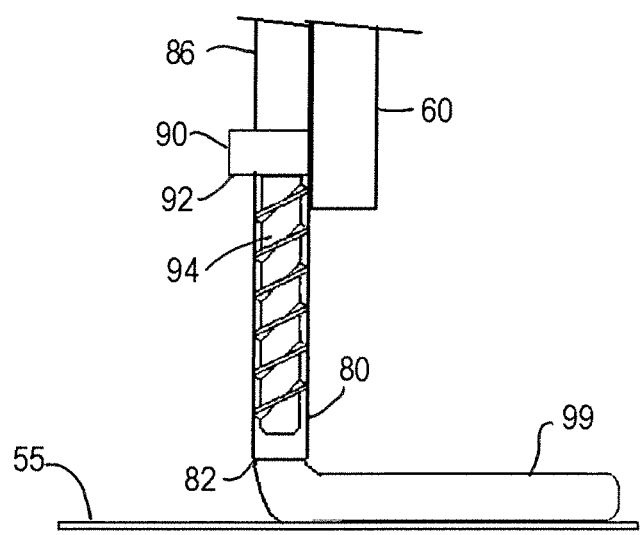
FIG. 2 is a sectional view of a nozzle, according to embodiments of this invention.

FIG. 2 illustrates an exemplary nozzle 80 with a slurry pump 90 connected on the arm 60 and including a motor drive 92 and a screw extruder 94 that pumps bead 99 onto surface 55. With this pump, the slurry can flow to the pump inlet and then the pump can be used to control pressure to the nozzle outlet 82 with the speed of the pump 90. This integrated nozzle/pump uses a pump and motor assembly that is compact enough to be attached directly to the nozzle 80 and move around with the nozzle 80. This design allows for highly-loaded slurries, such as over 50% vol. solids and/or with less binder, of virtually any powdered material. In addition, the thick slurry only needs to be pumped a small distance to the nozzle outlet, such as approximately 1 inch, which minimizes flow issues do to the non-Newtonian behavior of the slurry.

As illustrated in FIG. 2, the method of embodiments of this invention for building an article by additive manufacturing include pumping a slurry of a powdered material mixed with a volume of a liquid binder from a reservoir to a nozzle with the pump, and extruding the slurry with the nozzle in a X-Y plane at a constant Z-coordinate distance to form a layer of the article. The steps are repeat at each consecutive Z-coordinate distance until the article is built. The build can be performed outside of a chamber and at atmospheric conditions. The invention further includes heating the deposited layers on a deposition surface, such as to remove a liquid phase. The apparatus of this invention can incorporate an evaporation device 75 in combination with the deposition surface 55, and adapted to evaporate the solvent by heat and/or compressed air. Embodiments of this invention further include pyrolyzing the binder material away, such as during sintering of deposited slurry layers. The apparatus of this invention can incorporate or be used in combination with a sinter machine adapted to heat the article to remove the binder material and/or sinter the powder.

Embodiments of this invention further include filling any porosity of the resulting build article with an additional material after sintering, such as by submersion, spraying, or vapor infiltration methods. The additional material can be an additional metal material, such as bronze. The additional material can also be a material precursor, such as a polymer or liquid ceramic precursor, which is crosslinked or otherwise converted to the polymer or ceramic after saturation of the article. As another example, the article can be filled with a carbonaceous polymer that is pyrolyzed to a carbon material.

The particulate slurry of embodiments of this invention includes a binder material mixed with any suitable powder. Embodiments of this invention use a 40 micron mesh or less powder. Exemplary powders include, without limitation metal powders, ceramic powders, carbon powders, explosive or reactive materials (such as thermite), or combinations thereof. The binder can be any suitable binder material, such as a polymer in a solvent solution. Exemplary polymer binders include phenolic, novolac, or other solvatable binders. Exemplary non-polymer binders include, without limitation, sodium silicate, sodium acetate, Nicrobraze® binder gels, or combinations thereof.

The slurry of this invention preferably includes a high solids load, such as at least 50% by volume solids, more preferably at least 60% by volume solids, and desirably with less than 3% by volume binder material. The high solids loading results in high-density green parts after binder burnout, which leads to less shrinkage and distortion compared to other powder bed manufacturing techniques. It should also be noted that depending on the material in the slurry, the slurry may be shear-thinning or shear-thickening, but it is best to have all of the non-Newtonian phenomena occur close the nozzle to minimize the shear-thinning or— thickening that occurs before the slurry is dispensed onto the print area. Surfactants can also be used to control viscosity, and provide for higher powder levels.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 3:
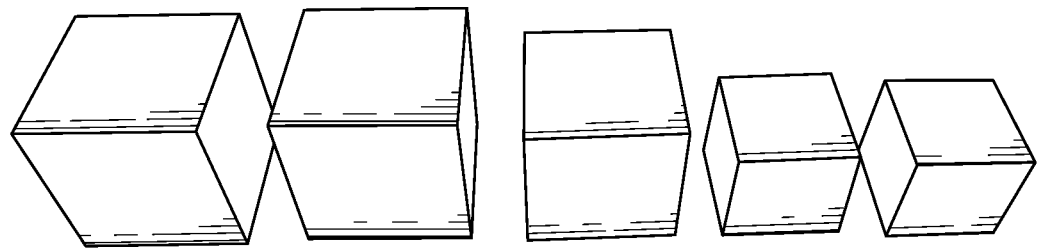
FIG. 3 shows cubes made according to exemplary embodiments of this invention.

FIG. 3 shows cubes printed according to embodiments of this invention. From left to right, with all cubes measuring 20×20×20 mm before sintering, the cubes were: 1. green stainless steel 420 (SS420); 2. SS420 sintered at 1100° C. for 5 hours under vacuum (73.4% dense); 3. SS420 sintered at 1380° C. for 5 hours under vacuum (76.1% dense); 4. SS420 with 12.5% $Si_3N_4$ sintering aid, sintered at 1225° C. for 7.5 hours under vacuum (97.0% dense); and 5. SS420 with 12.5% $Si_3N_4$ sintering aid, sintered at 1225° C. for 7.5 hours under vacuum, and polished after sintering (97.0% dense).

Figure 4:
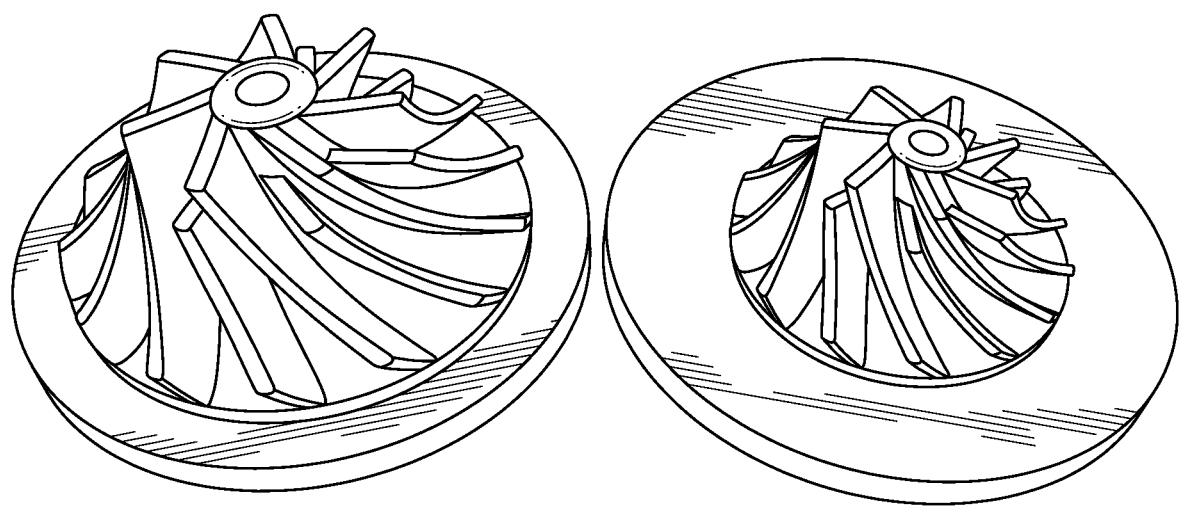
FIG. 4 shows pump impellers made according to exemplary embodiments of this invention.

FIG. 4 shows an unfired turbopump compressor on the left made with stainless steel 420, 12.5% silicon nitride, and Nicrobraz 'S' binder braze gel as the binder material. This part shrank 19.4% during sintering at 1225° C. for 7.5 hours, to provide the finished part on the right. The final part density was 97.0% of maximum theoretical density.

For the articles of FIGS. 3 and 4, the SS420/$Si_3N_4$ slurry was prepared and printed using the following process. 350.0 g of SS420 powder, 325 mesh (30 micron), was mixed dry with 50.0 g of $Si_3N_4$ powder, 400 mesh. 58.4 g of Nicrobraz 'S' binder gel was then added and mixed, by hand, until homogenous. The container of slurry was then placed in a vacuum chamber and evacuated to remove any air bubbles from the mixing process. The slurry was poured into a hopper on a print head and the hopper was covered with a vented cap to prevent solvent evaporation. The slurry was extruded into the forms seen above. Drying of the slurry occurs during the print, with compressed air assisting in evaporation, and the part is ready to be sintered immediately after extrusion completes. The part is placed in an alumina crucible with a ¼" layer of rough alumina grit covering the bottom for support during sample shrinkage. Sintering was done under vacuum, time and temperature varying depending on the desired final density.

A further turbopump compressor shown in FIG. 4 was printed using silicon carbide (SiC) with 7% $Al_2O_3$ as a sintering aid. The binder was BNSL binder produced by ZYP Coatings. Printing followed the same procedure outlined above, excluding the compressed air as it was not needed to assist evaporation of the solvent.

Figure 5:
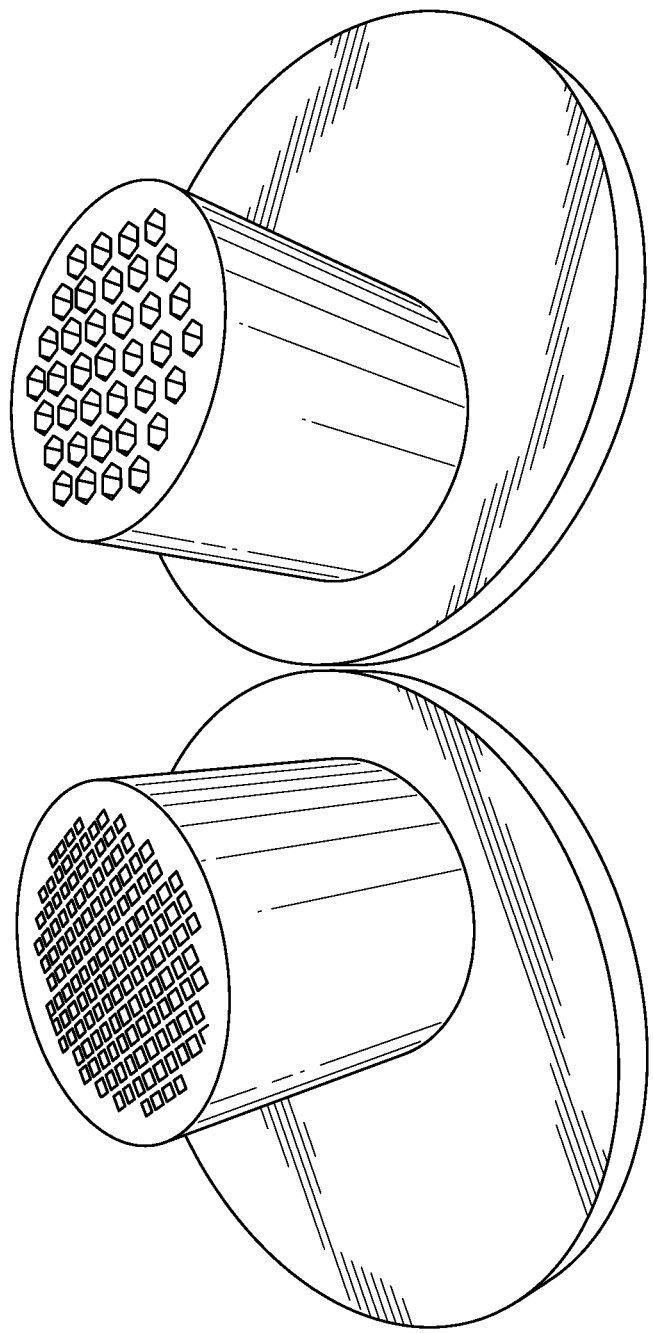
FIG. 5 shows further articles made according to exemplary embodiments of this invention.

FIG. 5 shows further printed articles, shaped to represent known catalyst articles. The sample on left was printed with aluminum oxide (alumina, $Al_2O_3$) using the BNSL binder produced by ZYP Coatings. The sample on the right is the same material after sintering with a slightly modified internal geometry. The alumina slurry was also proprietary to ZYP Coatings, consisting of $Al_2O_3$ powder and BNSL binder. The samples were printed with a grid infill pattern (left) and a hexagonal infill (right), using the same process outlined in the stainless steel examples above. The part on the right was sintered at 1225° C. for 7.5 hours under vacuum.

Thus, the invention provides an additive manufacturing apparatus and method for printing with, for example, metals, ceramics, and carbons. The use of a pump, and particularly a nozzle pump allows for higher density slurries, and improved article builds.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:
1. A method for building an article by additive manufacturing with a deposition nozzle on a moveable arm, the method comprising the steps of:
   providing a supply of particulate slurry;
   feeding the particulate slurry through the nozzle with a pump, wherein each of the nozzle and the pump is connected on and moveable with the moveable arm;
   depositing from the nozzle a first material bead of the particulate slurry in an initial layer of the particulate slurry in a first 2-D plane; and
   depositing from the nozzle a second material bead of the particulate slurry in a second layer of the particulate slurry in a second 2-D plane on the first material bead of the initial layer.
2. The method of claim 1, wherein the particulate slurry comprises a binder material mixed with a powder selected from a metal powder, a ceramic powder, a carbon powder, an explosive material, or combinations thereof.
3. The method of claim 2, wherein the binder material comprises a polymer material, a sodium silicate, a sodium acetate, or combinations thereof.
4. The method of claim 3, wherein the binder material comprises a polymer in a solvent.
5. The method of claim 4, wherein the binder material comprises a phenolic or novolac binder.
6. The method of claim 2, wherein the slurry comprises at least 50% by volume solids and less than 3% by volume binder material.
7. The method of claim 1, further comprising heating the article to remove the binder material and sinter the powder.
8. The method of claim 1, further comprising filling any porosity in the article with an additional material after sintering.
9. The method of claim 1, further comprising pumping the particulate slurry through a tubing from a slurry reservoir to the nozzle.
10. The method of claim 1, wherein the particulate slurry comprises a 40 mesh or less powder.
11. A method for building an article by additive manufacturing with a deposition nozzle on a moveable arm, the method comprising the steps of:
   a) mixing a volume of a powdered material with a volume of a liquid binder to form a slurry;
   b) pumping the slurry from a reservoir through the nozzle with a pump connected to the nozzle and the moveable arm, wherein the pump comprises a screw pump, a peristaltic pump, or a progressive cavity pump;
   c) extruding a material bead of the slurry by moving the nozzle and the pump in a X-Y plane at a constant Z-coordinate distance to form a layer of the article; and d) repeating steps b) and c) at each consecutive Z-coordinate distance until the article is built.

12. The method of claim 11, further comprising pyrolyzing the binder material away during sintering of deposited slurry layers.

13. The method of claim 11, wherein the extruding step c) and repeating step d) are each performed outside of a chamber and at atmospheric conditions.

14. The method of claim 11, wherein the particulate slurry comprises a binder material mixed with a powder selected from a metal powder, a ceramic powder, a carbon powder, an explosive material, or combinations thereof.

15. The method of claim 14, wherein the binder material comprises a polymer material, a sodium silicate, a sodium acetate, or combinations thereof.

16. The method of claim 1, wherein the pump is integrated within the nozzle on the arm.

17. The method of claim 1, wherein the pump comprises a screw pump, a peristaltic pump, or a progressive cavity pump.

18. The method of claim 1, wherein the pump comprises a progressive cavity pump.

19. The method of claim 11, wherein the pump comprises a progressive cavity pump.

* * * * *